United States Patent [19]
Suga et al.

[11] Patent Number: 6,164,532
[45] Date of Patent: Dec. 26, 2000

[54] POWER TRANSMISSION SYSTEM, POWER TRANSMISSION/COMMUNICATION SYSTEM AND READER AND/OR WRITER

[75] Inventors: Takashi Suga, Yokohama; Yoshihiko Hayashi, Setagaya-ku; Kouichi Uesaka; Masami Makuuchi, both of Yokohama; Ryozo Yoshino, Hadano, all of Japan

[73] Assignee: Hitachi, Ltd., Tokyo, Japan

[21] Appl. No.: 09/072,173

[22] Filed: May 5, 1998

[30] Foreign Application Priority Data

May 15, 1997 [JP] Japan ................................. 9-125710

[51] Int. Cl.$^7$ ....................................................... G06K 5/00
[52] U.S. Cl. ......................... 235/380; 235/375; 235/450
[58] Field of Search ................................... 235/380, 375, 235/472.02, 492, 377, 382, 436, 450, 487

[56] References Cited

U.S. PATENT DOCUMENTS

| | | | |
|---|---|---|---|
| 5,308,968 | 5/1994 | Yamaguchi | 235/142 |
| 5,418,353 | 5/1995 | Katayama et al. | 235/380 |
| 5,671,254 | 9/1997 | Nagata et al. | 375/326 |
| 5,698,838 | 12/1997 | Yamaguchi | 235/492 |
| 5,804,804 | 9/1998 | Fukatsu | 235/379 |
| 5,831,533 | 11/1998 | Kanno | 340/573 |
| 5,930,304 | 7/1999 | Hollenbeck et al. | 375/316 |
| 5,949,823 | 9/1999 | Sagata et al. | 375/256 |

FOREIGN PATENT DOCUMENTS

| | | |
|---|---|---|
| 0 533 584 | 3/1993 | European Pat. Off. . |
| 0 541 818 A1 | 5/1993 | European Pat. Off. . |
| 0 542 229 A1 | 5/1993 | European Pat. Off. . |
| 0 583 084 | 2/1994 | European Pat. Off. . |
| 0 596 124 A1 | 5/1994 | European Pat. Off. . |
| 0 829 940 A2 | 3/1998 | European Pat. Off. . |
| 785233 | 3/1995 | Japan . |
| 7220123 | 8/1995 | Japan . |
| 962816 | 3/1997 | Japan . |

*Primary Examiner*—Donald Hajec
*Assistant Examiner*—Daniel St. Cyr
*Attorney, Agent, or Firm*—Antonelli, Terry, Stout & Kraus, LLP

[57] ABSTRACT

The present invention provides a power transmission/communication system for transmitting power from a reader and/or writer to an IC card by an electromagnetic wave and performing transmission or transmission and reception of a communication signal between the reader and/or writer and the IC card by an electromagnetic wave, wherein the intensity of a magnetic field induced by the electromagnetic wave outputted from the reader and/or writer, i.e., the magnitude of power induced thereby and the time required to transmit the power are controlled.

15 Claims, 6 Drawing Sheets

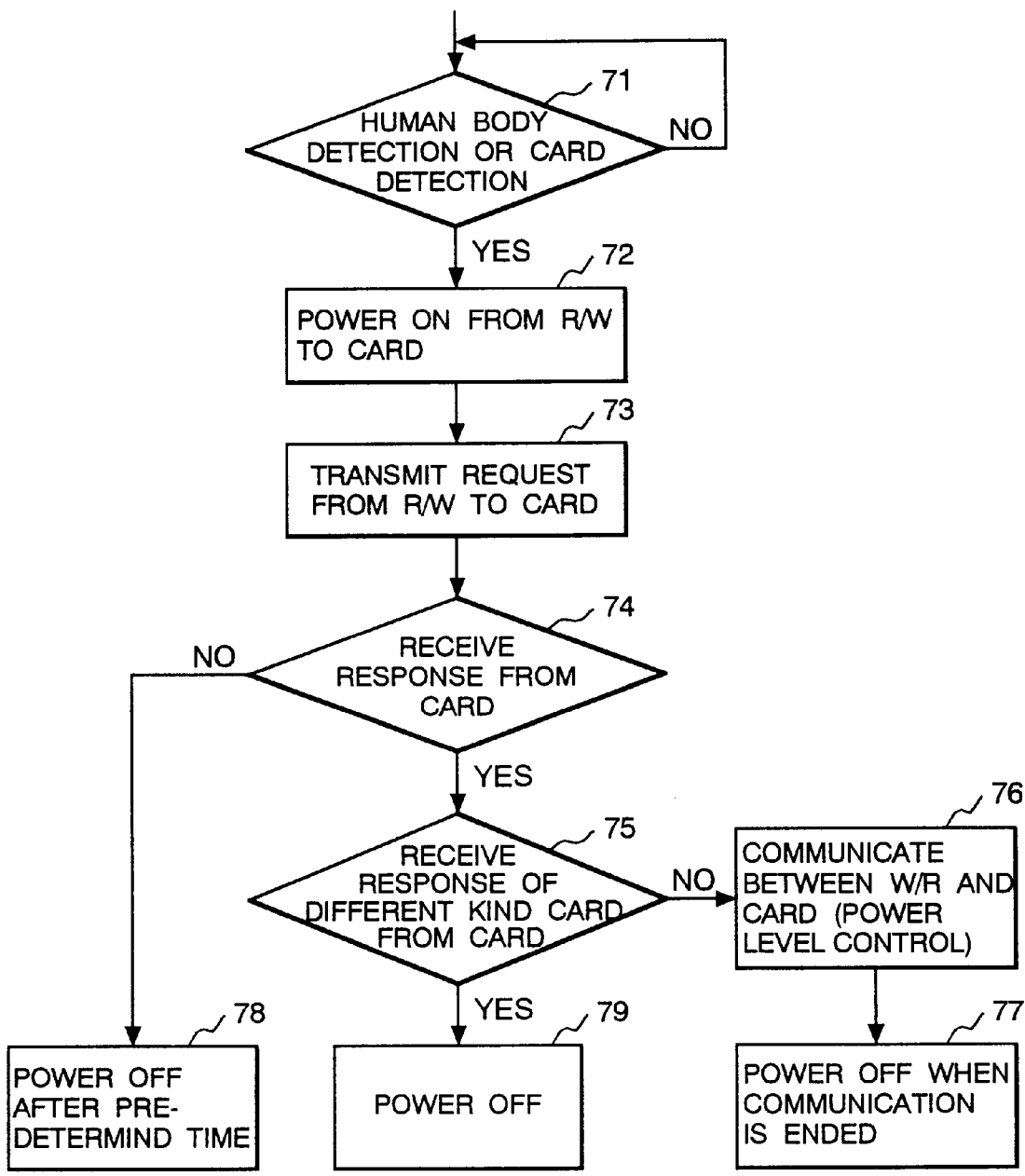

POWER TRANSMISSION SYSTEM, POWER TRANSMISSION/COMMUNICATION SYSTEM AND READER AND/OR WRITER

BACKGROUND OF THE INVENTION

The present invention relates to a power transmission system, a power transmission/communication system, a reader and/or writer and an IC card, wherein proximity radio operating power is transmitted between them and proximity radio cards such as a cash card, a credit card, a railway ticket, a commutation ticket, a coupon ticket, a management card, an ID card, a license, etc. employed in, for example, a cash dispenser, electronic money, an automatic checking and collecting system, a room in/out management system, etc., and communications are carried out therebetween.

It has heretofore been known in Japanese Patent Application Laid-Open Nos. Hei 7-85233 and 9-62816 that power is supplied to a proximity radio card (IC card) from a power supply side in noncontact with the card by using light or magnetic fields.

Japanese Patent Laid-open No. Hei 7-220123 also describes a noncontact type checking and collecting machine intended to reduce power consumption. In this machine, when a human/medium enters a specific output region and a wicket position sensor is turned ON, power is transmitted to the human/medium. In this case, if there is no communication with the human/medium side after an elapse of a specific time, the human/medium at the wicket is judged as a passenger having no noncontact card and transmission of the power is stopped. On the contrary, if there is communication with a noncontact card after an elapse of the specific time since transmission of the power, the human/medium at the wicket is judged as a fair passenger and transmission of the power is kept, and then, after an elapse of a specific time, it is judged that communication with the noncontact card is completed and transmission of the power is stopped.

In a noncontact card system (proximity radio card system) wherein when cash cards, credit cards, railway tickets, commutation tickets, etc. to be used at wickets in railway stations or on buses or at entrances and exits or the like are brought into IC cards, and when a user causes his/her IC card to pass through a reader and/or writer provided at a wicket in a railway station or on a bus or at an entrance and exit or the like in noncontact with the reader and/or writer, a power transmitting wave or a communication wave is radiated from a coil or an antenna of the reader and/or writer and the electromagnetic wave is received and induced by a coil or an antenna provided on the card side to thereby operate circuits on the card side, whereby a signal is detected, the power transmitting wave radiated from the coil or antenna of the reader and/or writer needs to satisfy the radio protection standard.

Meanwhile, the power transmitting wave is defined as the mean value of arbitrary six minutes in consideration of only a thermal effect to a human body by the radio protection standard from the relationship in which it is exposed to the human body and hands.

However, the prior art described in the above document, Japanese Patent Laid-open No. Hei 7-220123 is so configured that when a human/medium enters a specific output region and a wicket position sensor is turned ON, power is transmitted to the human/medium, and in this case, if there is communication with a noncontact card after an elapse of the specific time, the human/medium at the wicket is judged as a fair passenger and transmission of the power is kept, and then, after an elapse of a specific time, it is judged that communication with the noncontact card is completed and transmission of the power is stopped, and consequently, the above specific time has been required to be longer for certainly completing transmission of the power after the elapse of the specific time, and also the transmitted amount of the power has been required to be large for certainly transmitting the power to a noncontact card.

Accordingly, the above prior art has not taken into consideration a point of view that a power transmitting wave radiated from a coil or antenna of a reader and/or writer is required to satisfy the radio protection standard with sufficient allowance by minimizing the transmitted amount of power even during transmission of the power and also minimizing a time required to transmit the power.

SUMMARY OF THE INVENTION

With the foregoing problems in view, it is therefore an object of the present invention to provide a power transmission system, a power transmission/communication system, a reader and/or writer and an IC card, wherein power can be transmitted from a reader and/or writer or the like to a proximity radio card (IC card) such as a CPU or the like having a large power consumption of typically about 5 mW while a power transmitting wave is capable of satisfying the radio protection standard with sufficient allowance.

To achieve the above object, according to the present invention, there is provided a power transmission/communication system for transmitting power from a reader and/or writer to an IC card by an electromagnetic wave and transmitting or transmitting and receiving a communication signal between the reader and/or writer and the IC card by an electromagnetic wave, wherein the intensity of a magnetic field induced by the electromagnetic wave outputted from the reader and/or writer is controlled.

According to the present invention, there is also provided a power transmission/communication system for transmitting power from a reader and/or writer to an IC card by an electromagnetic wave and transmitting or transmitting and receiving a communication signal between the reader and/or writer and the IC card by an electromagnetic wave, wherein the magnitude of power induced by the electromagnetic wave outputted from the reader and/or writer and the time required to transmit the power are controlled.

According to the present invention, there is also provided a reader and/or writer for generating an electromagnetic wave between an IC card and the reader and/or writer to thereby perform both the supply of operating power to the IC card and transmission or transmission and reception of a communication signal by the generated electromagnetic wave, comprising means for controlling the intensity of a magnetic field induced by the electromagnetic wave.

According to the present invention, there is also provided a reader and/or writer for generating an electromagnetic wave between an IC card and the reader and/or writer to thereby perform both the supply of operating power to the IC card and transmission or transmission and reception of a communication signal by the generated electromagnetic wave, comprising means for controlling the magnitude of power induced by the electromagnetic wave and the time required to transmit the power.

According to the present invention, there is also provided a reader and/or writer for generating an electromagnetic wave between an IC card and the reader and/or writer to thereby perform both the supply of operating power to the IC card and transmission or transmission and reception of a communication signal by the generated electromagnetic wave, comprising means for detecting a human body or the IC card, and means for controlling, based on a signal detected by the detecting means, the intensity of a magnetic field induced by the electromagnetic wave or the magnitude (amplitude of a current or a voltage) of power induced by the magnetic field and the time required to transmit the power.

According to the present invention, there is also provided a reader and/or writer for generating an electromagnetic wave between an IC card and the reader and/or writer to thereby perform both the supply of operating power to the IC card and transmission or transmission and reception of a communication signal by the generated electromagnetic wave, comprising means for detecting a human body or the IC card, a communication control circuit for judging termination of communication between the IC card and the reader and/or writer, and means for controlling a starting time of power transmission based on a signal detected by the detecting means and controlling an ending time of power transmission when the communication control circuit judges termination of communication between the IC card and the reader and/or writer.

According to the present invention, there is also provided a reader and/or writer for generating an electromagnetic wave between an IC card and the reader and/or writer to thereby perform both the supply of operating power to the IC card and transmission or transmission and reception of a communication signal by the generated electromagnetic wave, comprising means for controlling, based on information of a power receiving level given to the IC card which is received from the IC card through the electromagnetic wave, the intensity of a magnetic field induced by the electromagnetic wave or the magnitude (amplitude of a current or a voltage) of power induced by the magnetic field and the time required to transmit the power.

According to the present invention, the above-described reader and/or writer further comprises a power supply portion for generating a power transmitting signal, an encoder circuit for encoding input transmission data, a modulator for amplitude-modulating a signal obtained from the encoder circuit and superimposing the amplitude-modulated signal on the signal obtained from the power supply portion, a power feeding circuit for feeding power, based on a signal obtained from the modulator, and a coil or a spiral antenna for generating the electromagnetic wave corresponding to the current fed by the power feeding circuit.

According to the present invention, there is also provided an IC card comprising a receiving portion for receiving power by an electromagnetic wave, a rectifying power supply circuit for rectifying the power received by the receiving portion, converting the rectified power into a DC voltage and supplying the DC voltage, a power receiving level detector circuit for detecting a power receiving level obtained from the rectifying power supply circuit, a microcomputer for generating information corresponding to the power receiving level detected by the power receiving level detector circuit, a decoder circuit for decoding information corresponding to a power receiving level outputted from the microcomputer, and a transmitter portion for modulating a signal based on a decoded signal corresponding to a power receiving level obtained from the decoder circuit and transmitting the modulated signal therefrom by an electromagnetic wave.

With the above-described constitution, power can be transmitted from a reader and/or writer to a proximity radio card (IC card) such as a CPU or the like having a large power consumption of typically about 5 mW and communications can be established by radio between the reader and/or writer and the proximity radio card while a power transmitting wave is capable of satisfying the radio protection standard with sufficient allowance.

BRIEF DESCRIPTION OF THE DRAWINGS

Other objects and advantages of the present invention will be more completely understood from the following detailed description, taken in conjunction with the accompanying drawings wherein:

FIG. 7 is a diagram showing a control flow of power transmission in the reader and/or writer according to the present invention.

DETAILED DESCRIPTION OF THE PREFERRED EMBODIMENTS

Preferred embodiments of the present invention will hereinafter be described with reference to the accompanying drawings.

A description will first be made of a system for transmitting noncontact card operating power between noncontact cards such as a cash card, a credit card, a railway ticket, a commutation ticket, a coupon ticket, a management card, an ID card, a license, etc. employed in a cash dispenser, electronic money, an automatic checking and collecting system, a room in/out management system, etc., and a reader and/or writer and performing communications therebetween.

Figure 1:
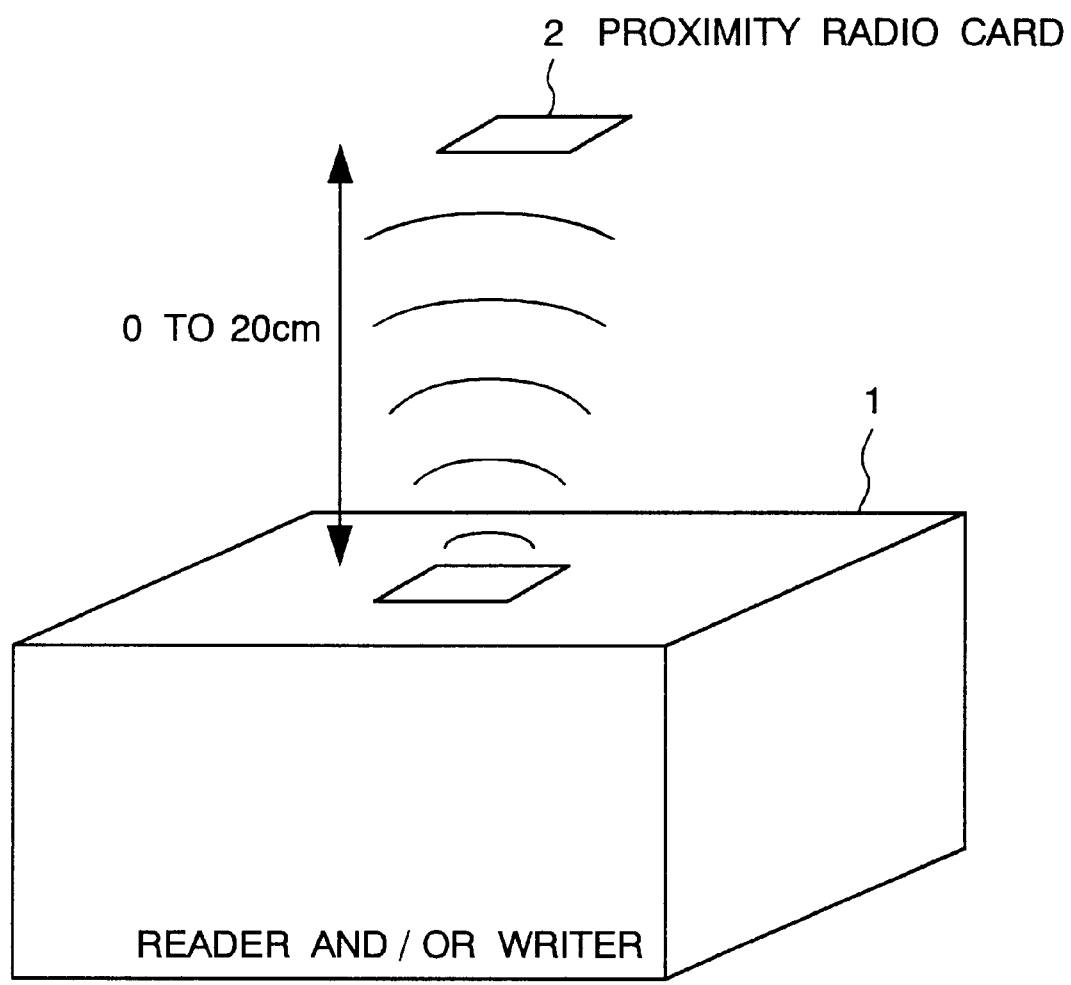
FIG. 1 is a schematic configurational perspective view showing a power transmission/communication system wherein power is transmitted by radio between a reader and/or writer according to the present invention and a proximity radio card (IC card) and communications are done therebetween via radio.

FIG. 1 is a diagram schematically showing a configuration of a power transmission/communication system wherein power is transmitted by radio from a reader and/or writer 1 provided at a wicket or on a bus or at an entrance and exit or in a predetermined place to a noncontact card (proximity radio card: IC card) 2 to be passed the reader and/or writer 1 with noncontact or in close proximity to it and communications are done therebetween via radio. The noncontact card (proximity radio card: IC card) 2 is carried by a user and caused to pass through the reader and/or writer 1 provided at the wicket or on a bus or at an entrance and exit with noncontact therewith, at a distance of about 20 cm away therefrom to thereby transmit and receive information about a cash card, a credit card, a railway ticket, a commutation ticket, etc., thus making it possible to perform the role of the cash card, credit card, railway ticket, commutation ticket, etc.

Figure 2:
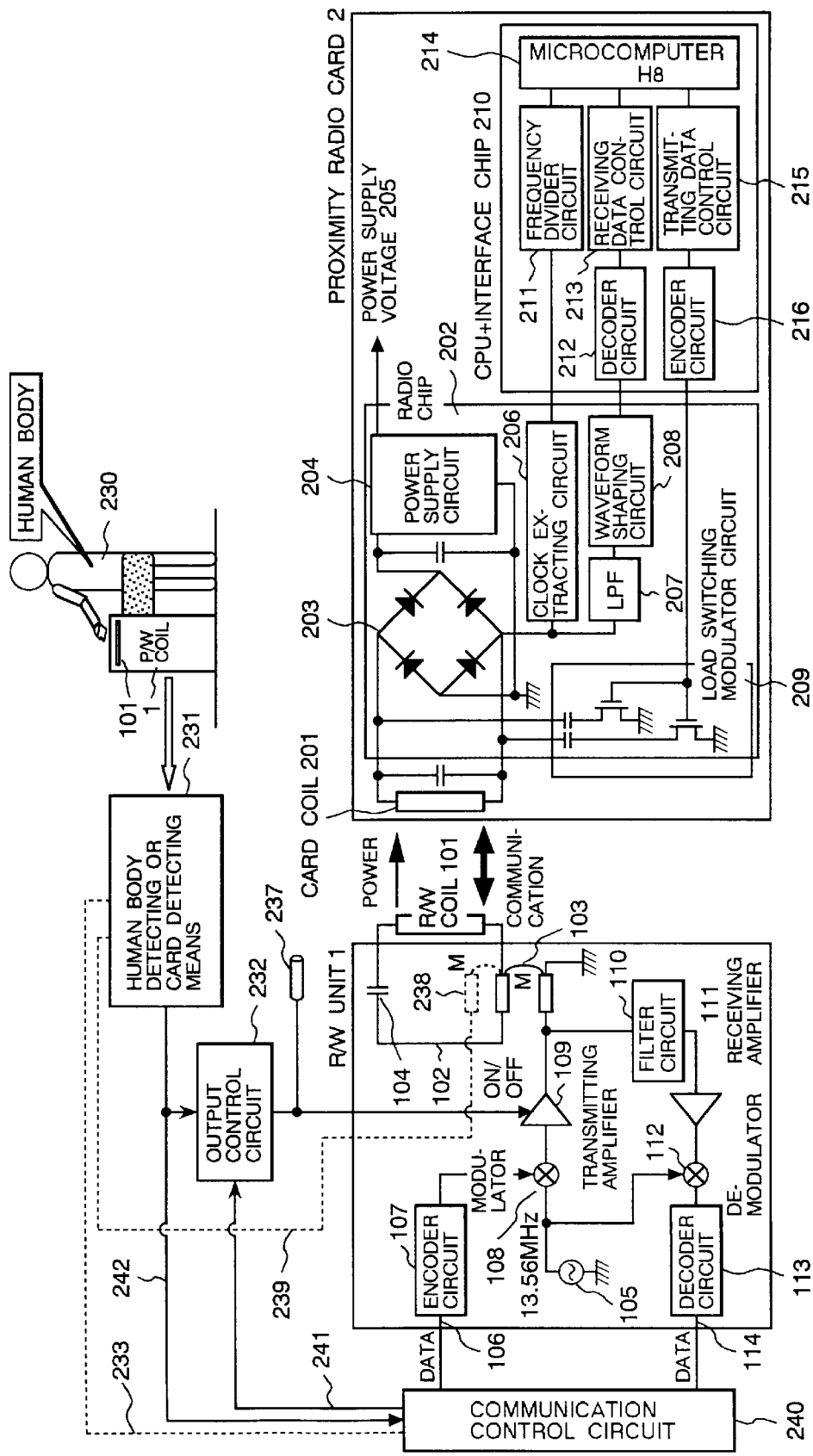
FIG. 2 is a lock diagram illustrating one embodiment of a system wherein power is transmitted by radio between a reader and/or writer according to the present invention and a proximity radio card (IC card) and communications are made therebetween via radio.
Figure 3:
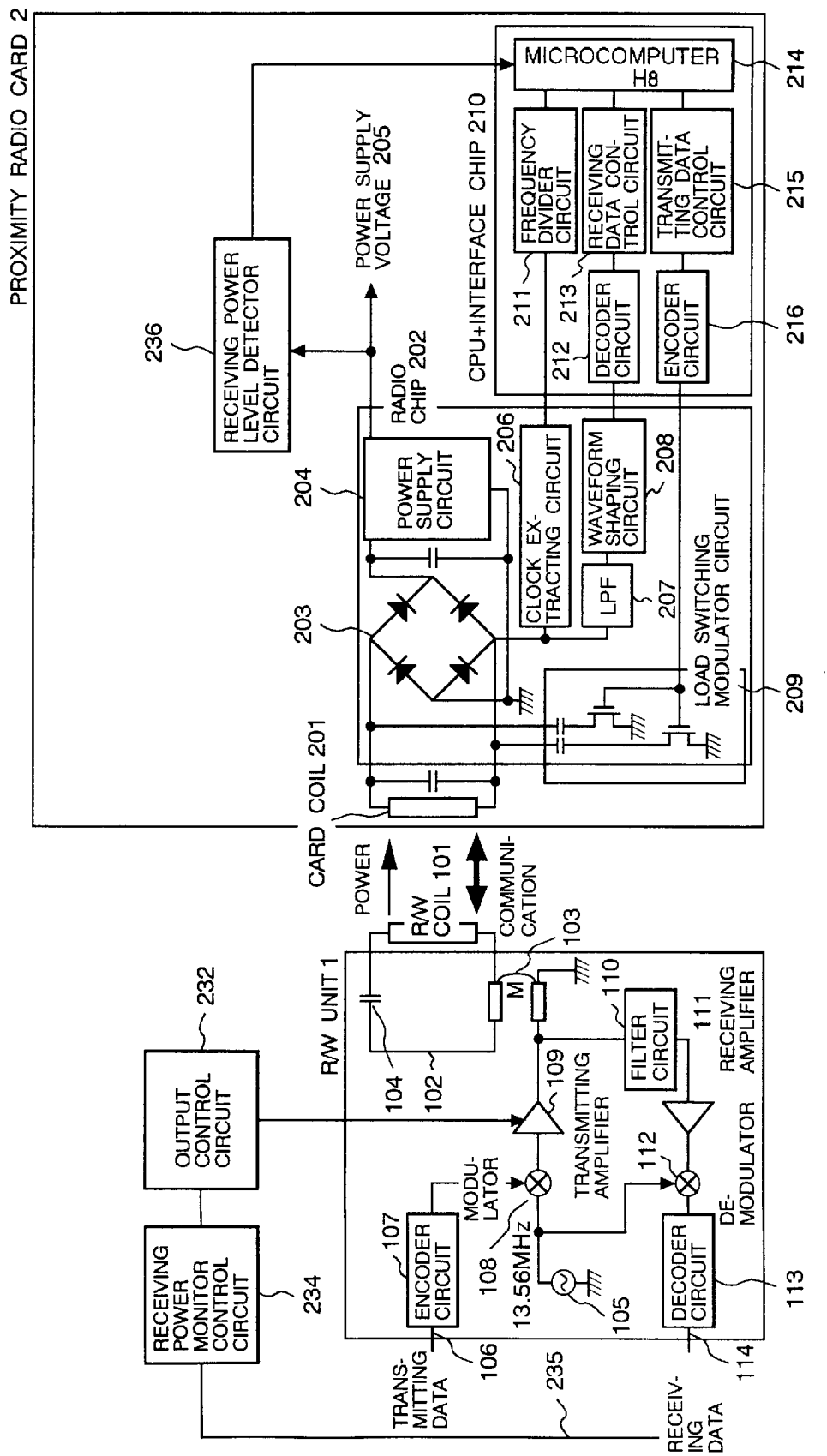
FIG. 3 is a block diagram showing another embodiment of a system wherein power is transmitted by radio between a reader and/or writer according to the present invention and a proximity radio card (IC card) and communications are carried out therebetween via radio.
Figure 5:
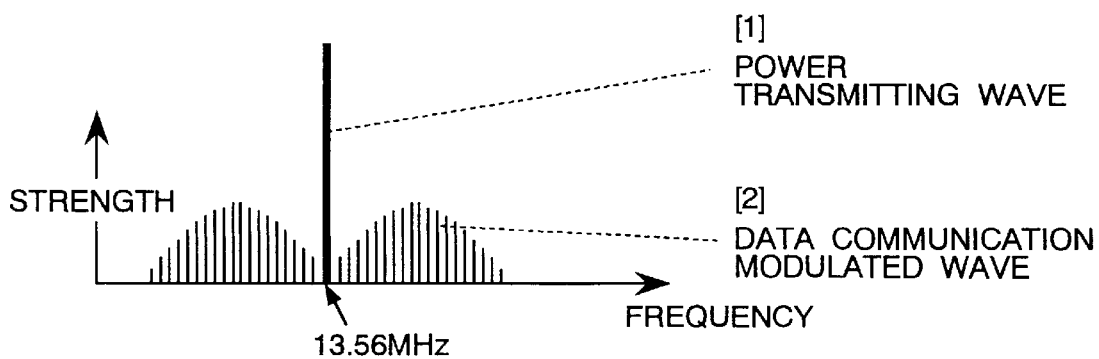
FIG. 5 is a diagram showing the relationship between a power transmitting wave and a modulated wave for data communications according to the present invention.

FIGS. 2 and 3 are respectively block diagrams showing embodiments of systems wherein power is transmitted by radio between readers and/or writers 1 and noncontact cards (proximity radio cards: IC cards) 2 and pieces of information are further transmitted and received (communicated) by radio. Each of the embodiments shown in FIGS. 2 and 3 shows the case in which both the transmission of power and the transmission and reception of communications are carried out by an electromagnetic wave (radio) comprised of a power transmitting wave and a data communication modulated wave shown in FIG. 5 between a R/W coil 101 provided within a R/W unit 1 and a card coil 201 formed in the proximity radio card 2. Thus, the power transmitting wave and signal wave in the ASK modulation system are equivalent to different frequency components as viewed from a frequency region or domain. However, the amplitude of the power transmitting wave simply varies according to a signal velocity as viewed from a time domain. In other words, the modulated wave produced by multiplying the power transmitting wave by the signal wave is seen in the time domain as if the waveform amplitude of the power transmitting wave simply varies upward and downward. When the modulated wave is transmitted by radio, the power transmitting wave and the signal wave are considered to be transmitted through separate antennas respectively. In the present embodiments, however, the field intensity is limited to be within the Wireless Telegraphy Act (500 $\mu$V/m at a distance of 3 m) and the modulated wave is transmitted through a single antenna (R/W coil) 101, in order to simplify the noncontact card (proximity radio card: IC card) 2.

Namely, the R/W (Reader/Writer) unit 1 comprises a power supply 105 for generating a high frequency voltage of 13.56 MHz, an encoder circuit 107 for encoding input data (DATA) 106 to be transmitted to the proximity radio card 2, a modulator 108 for superimposing a voltage being amplitude modulated (Amplitude Shift Keying modulation) by a signal encoded by the encoder circuit 107 on a high frequency voltage of 13.56 MHz generated from the power supply 105, a transmitting amplifier 109 for amplifying a signal ASK-modulated and superimposed on the high frequency voltage of 13.56 MHz by the modulator 108, a matching circuit (feeding circuit) 102 for coupling a signal amplified by the transmitting amplifier 109 thereto through an inductance coupling 103 and having a capacitor 104 to make impedance matching, thereby preventing impedance reflection, a R/W coil 101 for generating an electromagnetic wave to transmit power and data according to the output of the matching circuit 102 and reception data transmitted from a card coil 201 of the proximity radio card 2 by the electromagnetic wave, a filter circuit 110 for removing a noisecomponent from a signal produced through the inductance coupling 103 by taking matching to a signal received by the R/W coil 101 with the matching circuit 102, a receiving amplifier 111 for amplifying a signal obtained from the filter circuit 110, a demodulator 112 for demodulating the signal amplified by the receiving amplifier 111 using the voltage signal of the high frequency of 13.56 MHz obtained from the power supply 105, a decoder circuit 113 for decoding the signal demodulated by the demodulator 112 and outputting the decoded signal as reception data (DATA) 114 therefrom, and a communication control circuit 240 which receives a signal 242 supplied from human body detecting/or card detecting means 231 when the means 231 detects the fact that a human body 230 enters an entrance or the proximity radio card 2 is placed on the upper surface of the R/W unit 1 and creates a request signal to the card 2 as the transmission data 106, receives as the reception data 114 a response signal from the card 2 and a power receiving level data detected by a power receiving level detector circuit 236 in the card 2, and controls communication between the R/W unit 1 and the card 2.

The proximity radio card (noncontact card: IC card) 2 comprises a card coil 201 for receiving an electromagnetic wave generated to perform transmission of power and data from the R/W coil 101 of the R/W unit 1 and generating an electromagnetic wave corresponding to the transmission data subjected to load-switching modulation; a radio chip 202 comprising: a matching and rectifier circuit 203 for rectifying the power of 13.56 MHz received by the card coil 201 and providing impedance matching to the transmitting and receiving signals, a power supply circuit 204 for supplying a constant DC voltage 205 of about 2 to 5 V at a power level of about 5 mW obtained from a rectified induced voltage outputted from the matching and rectifier circuit 203, a clock extracting circuit 206 for extracting a clock from a receiving signal obtained from the matching and rectifier circuit 203, an LPF circuit 207 for removing noise components from the receiving signal obtained from the matching and rectifier circuit 203, a waveform shaping circuit 208 for shaping the waveform of a receiving signal obtained from the LPF circuits, and a load switching modulator circuit 209 for subjecting a transmitting signal to load switching modulation, supplying the modulated signal to the matching and rectifier circuit 203 to allow impedance matching and supplying the modulated signal to the card coil 201; and a CPU+interface chip 210 comprising a frequency divider circuit 211 for dividing the frequency of a clock signal extracted by the clock extracting circuit 206 of the radio chip 202 to thereby generate a signal for operating a microcomputer 214, a decoder circuit 212 for decoding a signal obtained from the waveform shaping circuit 208 of the radio chip 202, a reception data control circuit 213 for controlling decoded data (reception data) obtained from the decoder circuit 212 and inputting the data to the microcomputer 214, a transmission data control circuit 215 for obtaining data from the microcomputer 214 by controlling the transmission data, an encoder circuit 216 for encoding transmission data obtained from the transmission data control circuit 215 by controlling them and inputting the data to the load switching modulator circuit 209 of the radio chip 202, and the microcomputer 214 of H8 or the like having a built-in memory for storing information as a card therein and for performing the processing of transmitting and reception data and the transfer of data with the memory, said CPU+ interface chip 210 being supplied with a stable power supply voltage 205 from the power supply circuit 204 of the radio chip 202.

Incidentally, the R/W coil 101 and the card coil 201 for transmitting power by an electromagnetic wave (radio) is used to improve the efficiency of power transmission in a short range. When the coil 201 is formed on the proximity radio card 2, an advantage is brought about in that it is strong against deformation. Both the R/W coil 101 and the card coil 201 may be formed with spiral antennas.

In the proximity radio card system as has been described above, power can be transmitted by radio and further information transmission and reception (communication) by radio can be performed between the reader and/or writer 1 and the noncontact card 2 when the noncontact card (proximity radio card: IC card) 2 is made to approach the reader and/or writer 1. In other words, in the proximity radio card system, a power transmitting wave or a communication wave is radiated by a coil or a spiral antenna 101 for the reader and/or writer, and the electromagnetic wave is received by a coil or a spiral antenna 201 on the card side, so that a voltage is induced which operates the circuits on the card side and allows the detection of signals.

It is now considered that the coil or the spiral antenna 101 employed in the reader and/or writer 1 is small enough to a wavelength of 22 m determined according to the use frequency of 13.56 MHz and the distribution of a current on the antenna is substantially uniform. Therefore, the electric field is strongly generated in the side direction of the antenna and the magnetic field is strongly produced in the vertical direction thereof.

In this case, when the noncontact card 2 equipped with the coil or the spiral antenna 201 is carried in the vertical direction, the power transmitting wave or signal wave can be transmitted and received.

Meanwhile, the power transmitting wave of 13.56 MHz is defined as the mean value of arbitrary six minutes in consideration of the influence on a human body by the radio protection standard from the relationship in which it is exposed to the human body and hands. It is thus necessary that in order to satisfy the radio protection standard, power is transmitted to the proximity radio card 2 during a short time interval where possible and a power transmission output is set to a low level inclusive of a 0 level where practicable during a period other than that.

The embodiments for satisfying the radio protection standard with respect to the power transmitting wave of 13.56 MHz as described above will be explained with reference to FIGS. 2 and 3.

Figure 4:
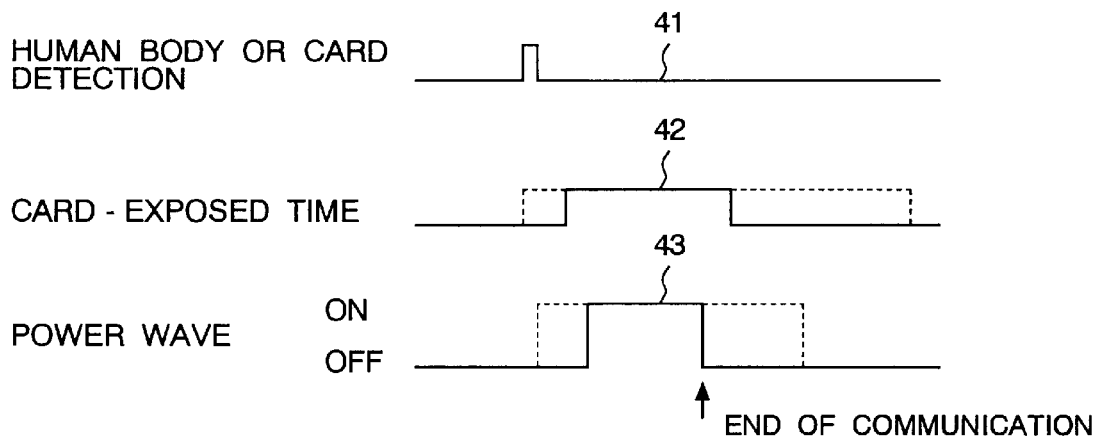
FIG. 4 is a diagram depicting the relationship between a human body and detection shown in FIG. 2 and control signals.

In the embodiment shown in FIG. 2, a human body detecting or card detecting means 231 detects that a human body 230 has come into an entrance or the proximity radio card 2 has been presented on the upper surface of the R/W unit 1 to thereby obtain a signal designated at numeral 41 in FIG. 4. A user 230 proceeds to the entrance while carrying the proximity radio card 2. The time spent in subjecting the proximity radio card 2 to an electromagnetic field generated from the R/W coil (antenna) 101 of the R/W unit 1 varies and thereby falls between a solid line and a chain line as designated at numeral 42 in FIG. 4. An output control circuit 232 forms or produces a control signal (which will fall within a range between a solid line and a chain line, for example) 43 turned ON during a desired time interval as shown in FIG. 4, based on a detection signal 242 obtained from the human body detecting or card detecting means 231. Even if the time required to subject the proximity radio card 2 to the R/W coil (antenna) 101 of the R/W unit 1 is varied, the ON time interval for the control signal 43 may preferably be set to the required minimum in which power is supplied from the R/W coil (antenna) 101 of the R/W unit 1 to the proximity radio card 2 through the use of power transmission by radio (electromagnetic wave) and communications can be executed between the R/W unit 1 and the proximity radio card 2. In other words, even if the time spent in subjecting the proximity radio card 2 to the R/W coil (antenna) 101 of the R/W unit 1 varies, the ON time for the control signal 43 may be a second unit capable of operating the proximity radio card 2 or a time interval less than it. However, the time between the human body detection or card detection and the subjection of the proximity radio card 2 to the R/W coil (antenna) 101 of the R/W unit 1 will be set to the order of a few seconds to 10 seconds or so at most. The control signal 43 obtained from the output control circuit 232 may be applied to, for example, the transmitting antenna 101 to perform its ON and OFF control. At this time, the OFF control is not necessarily required thereat and the control signal 43 may be set to a state close to OFF. It is unnecessary to perform the ON and OFF control at the transmitting amplifier 109. An electromagnetic wave generated from the R/W coil (antenna) 101 corresponding to the final stage may be ON-OFF controlled. As a result, the electromagnetic wave is generated from the R/W coil (antenna) 101 of the R/W unit 1 during the ON time (corresponding to a second unit or less than it) for the control signal 43 to transmit power to the card coil 201, whereby a constant DC power supply voltage 205 of about 2 to 5 V at a power level of about 5 mW is generated and supplied. Thus, the proximity radio card 2 can be sufficiently operated.

Incidentally, the control signal 43 obtained from the output control circuit 232 may be displayed on a display means 237 such as a light emitting element or the like provided on the R/W unit 1 to notify it to the user. When the human body is detected, a light emitting element for emitting light such as infrared radiation or the like and a light detecting or receiving element are provided so as to be opposed to an entrance's passage as the human body detecting or card detecting means 231. Thereafter, when the user enters into the passage, the blocking of the light by the human body may be detected. At this time, an influence-free electromagnetic wave other than the light may be used. When the card is detected, a light emitting element for emitting light such as infrared radiation or the like and a light receiving element are provided so as to be opposed to a space to which the proximity radio card 2 is presented, as the human body detecting or card detecting means 231. Thereafter, when the proximity radio card 2 is presented to or introduced into the space, the blocking of the light by the card may be detected. At this time, an influence-free electromagnetic wave other than the light may be used. In addition to this, a timer is provided within the output control circuit 232 so that a short-time ON signal is periodically generated by the output control circuit 232 in a cycle shorter than the minimum cycle in which the proximity radio card 2 is presented to the R/W unit 1. Thereafter, the ON signal is applied to the transmitting amplifier 109 so that an electromagnetic wave is periodically generated from the R/W coil (antenna) 101 of the R/W unit 1 for a short time. In this condition, the electromagnetic wave is received by the card coil 201 at the instant at which the proximity radio card 2 is presented to the R/W unit 1 to generate a power supply voltage 205. Thereafter, some type of signal is transmitted by radio from the proximity radio card 2 to the reader and/or writer 1, so that a card detected signal can be obtained from the decoder circuit 113 of the R/W unit 1. The card detected signal 233 may be inputted to the human body detecting or card detecting means 231. In short, the card detected signal may be obtained from the decoder circuit 113 of the R/W unit 1 at the instant at which the proximity radio card 2 is presented to the R/W unit 1.

The human body or card detecting means 231 monitors the impedance of the R/W coil 101 through an inductance 238 in a state in which no power is transmitted to the proximity radio card 2, to thereby make it possible to obtain a card detected signal 239. Namely, since the impedance of the R/W coil 101 varies as the proximity radio card 2 approaches thereto, the presence of the proximity radio card 2 can be detected by detecting its variation through the use of the inductance 238.

In the present invention, the reader and/or writer includes the human body or card detecting means 231 and the output control circuit 232.

According to the embodiment described above, the power transmitting wave can satisfy the radio protection standard with sufficient allowance. In this condition, the power can be transmitted from the R/W unit 1 to the proximity radio card 2. Further, the communications can be carried by radio between the R/W unit 1 and the proximity radio card 2.

In the embodiment shown in FIG. 3, a power receiving level detector circuit 236 for detecting the level of a power supply voltage 205 outputted from a power supply circuit 204 of a radio chip 202 is provided within a proximity radio card 2. When the proximity radio card 2 is presented and exposed to an electromagnetic wave generated from a R/W coil (antenna) 101 of a R/W unit 1, power is transmitted from the R/W unit 1 to the proximity radio card 2 so that receiving power is obtained from the power supply circuit 204. The power receiving level detector circuit 236 detects the level of the receiving power and inputs the detected level signal to a microcomputer 214. Thereafter, the microcomputer 214 generates information corresponding to the input level signal as transmission data. An encoder circuit 216 encodes the information and inputs the so-processed information to a load switching modulator circuit 209 where it is subjected to load switching modulation. Thereafter, a card coil 201 transmits the power receiving level information to the R/W coil 101 of the R/W unit 1 by radio. The R/W coil 101 of the R/W unit 1 receives the power receiving level information therein and obtains power receiving level information 235 from a decoder circuit 113. Thereafter, the R/W coil 101 inputs the power receiving level information 235 to a receiving power monitor/control circuit 234 (corresponding to the communication control circuit 240 in the embodiment shown in FIG. 2). Further, the receiving power monitor/control circuit 234 determines (monitors) whether the card receiving power is enough. If the card receiving power is found to be large and enough, then the receiving power monitor/control circuit 234 outputs a signal for narrowing transmitting power down to the required minimum level and inputs it to an output control circuit 232. THe output control circuit 232 inputs a signal for controlling transmitting power level obtained from the receiving power monitor/control circuit 234 to, e.g., a transmitting amplifier 109 to control the amplitude of a signal outputted from the transmitting amplifier 109. As a result, the power having the required minimum level is constantly transmitted from the R/W coil 101 to the card coil 201 of the proximity radio card 2 by an electromagnetic wave. Even in the case of the present embodiment, the power transmitting wave can satisfy the radio protection standard with sufficient allowance and the power can be transmitted from the R/W unit 1 to the proximity radio card 2. Further, communications can be established between the R/W unit 1 and the proximity radio card 2.

In the present embodiment, a timer is installed in the output control circuit 232 so that a short-time ON signal is periodically generated by the output control circuit 232 in a cycle shorter than the minimum cycle in which the proximity radio card 2 is presented to the R/W unit 1. Thereafter, the output control circuit 232 superimposes this signal on the transmitting power level control signal and applies the so-processed signal to, e.g., the transmitting amplifier 109. With its application, an electromagnetic wave is periodically generated from the R/W coil (antenna) 101 of the R/W unit 1 for a short time and the power of the required minimum level may be transmitted by the electromagnetic wave. In this case, the power of the required minimum level is transmitted from the R/W coil 101 to the card coil 201 of the proximity radio card 2 only during a period corresponding to the required minimum level. Thus, the radio protection standard can be further satisfied with the power transmitting wave with sufficient allowance.

Further, it is apparent that the power receiving level detector circuit 236 provided in the card 2 shown in FIG. 3 may be provided in the card 2 shown in FIG. 2.

Next, there will be described, with reference to FIG. 7, a control flow of power transmission in the reader and/or writer for transmitting power from the R/W coil 101 to the card coil 201 of the proximity radio card 2 by an electromagnetic wave usually at a necessary minimum level for a necessary minimum time. First, if at Step 71 the human body detecting or card detecting means 231 detects a human body or a card, the control flow goes on to Step 72 at which the output control circuit 232 outputs an ON signal based on the detection signal 242 to turn ON the transmitting amplifier 109, thereby transmitting power to the card 2 by an electromagnetic wave. Next, at Step 73, the communication control circuit 240 creates a request signal as the transmission data 106 based on the detection signal 242 from the human body detecting or card detecting means 231 and transmits the signal to the card 2. If at Step 74 the communication control circuit 240 does not receive a response signal from the card 2 as the reception data 114 as a result that the card 2 has not been normally presented on the R/W coil 101, the control flow goes on to Step 78 at which the communication control circuit 240 outputs a signal for turning OFF transmission of the power to the output control circuit 232 after an elapse of a specific time. As a result, the output control circuit 232 outputs an OFF signal to the transmitting amplifier 109 to stop transmission of the power. Further, if at Step 74 the communication control circuit 240 receives a response signal from the card 2 as the transmission data 114, the control flow goes on to Step 75 at which it is judged whether or not the card is a different kind card on the basis of data indicating the kind of the card contained in the response signal. If it is judged that the card is a different kind card, the communication control circuit 240 outputs a signal for turning OFF transmission of the power to the output control circuit 232 to stop transmission of the power. If it is judged that the card is not a different kind card, the control flow goes on to Step 76 at which the communication control circuit 240 receives data of a power receiving level detected by the power receiving level detector circuit 236 contained in the response signal, and if the power receiving level is more than the minimum level necessary for transmission, the communication control circuit 240 outputs a signal for lowering the transmission power to the output control circuit 232. The output control circuit 232 transmits a control signal for lowering the transmitting power to the transmitting amplifier 109 to thereby control the transmitting amplifier 109 so as to lower an amplifying ratio of the transmitting amplifier 109. If the card is not a different kind card, at Step 76, the communication control circuit 240 executes communication with the card 2 based on the transmission data 106 and the reception data 114, and at Step 77, when the communication terminates (is ended), the communication control circuit 240 outputs a signal for turning OFF transmission of the power to the output control circuit 232 to stop transmission of the power.

As described above, the power is supplied from the R/W unit 1 usually at the necessary minimum level and at the necessary minimum time, to thus satisfy the radio protection standard with sufficient allowance.

Further, since both the amplifying ratio and turn ON/OFF of transmission of power can be controlled by controlling the transmitting amplifier 109 provided between the modulator 108 and inductance coupling 103 with the output control circuit 232, the circuit configuration can be simplified.

An embodiment in which a radiation field satisfies the restricted value (500 μV/m at a distance of 3 m) of the Wireless Telegraphy Act and a communicable range is enlarged, will next be explained as a coil or a spiral antenna 101 employed in a reader and/or writer 1.

Figure 6:
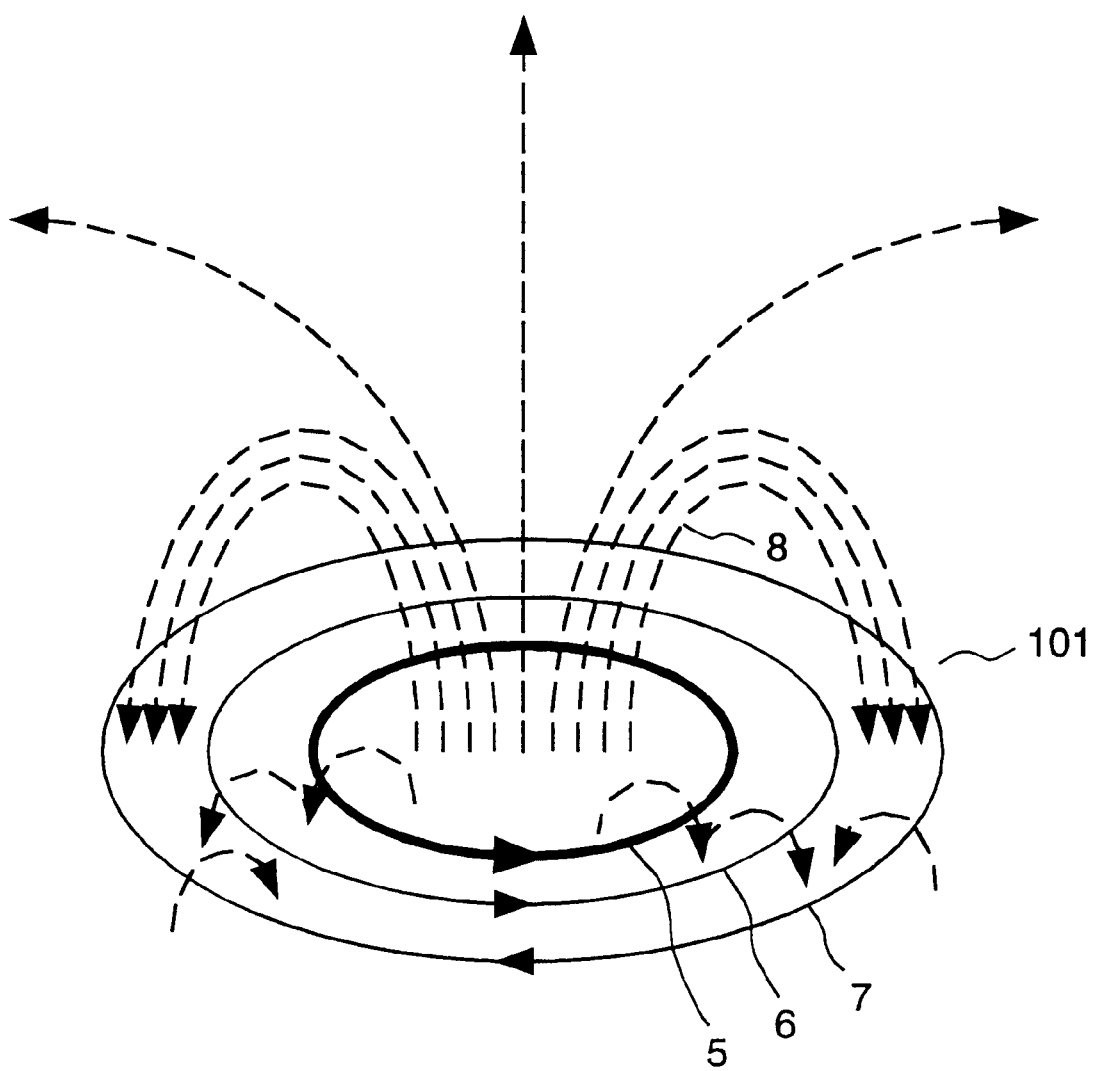
FIG. 6 is a perspective view illustrating a basic configuration of a R/W coil (antenna) mounted to a reader and/or writer according to the present invention.

FIG. 6 is a diagram showing a basic configuration of a coil or spiral antenna 101 attached to a reader and/or writer 1. Reference numeral 5 indicates a main coil or a spiral antenna for the coil or spiral antenna 101 for generating an electromagnetic wave to perform the transmission of power and data. Reference numerals 6 and 7 indicate a pair of auxiliary coils or spiral antennas provided outside (around) the main coil or spiral antenna 5 in order to introduce or bring most of magnetic fields 8 produced by the main coil or spiral antenna 5 therein to prevent them from extending to a great distance and control the intensity of an electromagnetic field at a great distance. The direction of a current to flow through the auxiliary coil or spiral antenna 6 is identical to the direction of a current to flow through the main coil or spiral antenna 5. Further, the direction of a current to flow through the auxiliary coil or spiral antenna 7 is opposite to the direction of the current to flow through the auxiliary coil or spiral antenna 6. As a result, most of the magnetic fields 8 produced by the main coil or spiral antenna 5 are introduced or led in by the pair of auxiliary coils or spiral antennas 6 and 7. Thus, the field intensity in the distance is canceled and thereby becomes weak. It is therefore possible to allow the radiation field to meet the restricted value (500 μV/m at the distance of 3 m) of the Wireless Telegraphy Act, increase the upper limit of the value of the current flowing through the main coil or spiral antenna 5 and enlarge a communicable range. Namely, most of the magnetic fields 8 produced by the main coil or spiral antenna 5 are led in by the pair of auxiliary coils or spiral antennas 6 and 7. Thus, the intensity of the electromagnetic field is canceled in the great distance and thereby reduced, whereas the electromagnetic field produced by the main coil or spiral antenna 5 is generated so as to be covered in the short distance. Even if the value of the current to flow through the main coil or spiral antenna 5 is increased and this electromagnetic filed is rendered strong, the restricted value (500 μV/m at the distance of 3 m) of the Wireless Telegraphy Act can be met. As a result, the communicable range and the distance to space the proximity radio card 2 away from the reader and/or writer 1 can be enlarged. Namely, the reader and/or writer 1 for performing both the supply of operating power to the IC card 2 and the transmission or transmission and reception of a communication signal causes a plurality of coils or spiral antennas 5, 6 and 7 to distribute currents flowing in the same direction and opposite in phase or flowing in the opposite direction and being in phase, thereby generating magnetic fields which work as components opposite in phase to each other and synthesizing their directivities. Thus, power transmission and satisfactory communications are allowed in very near or short regions which no interfere with each other, whereas the electromagnetic fields interfere with each other and cancel each other out in a great distance. Therefore, the reader and/or writer 1 is provided with the antenna 101 for controlling a radiation field.

As described above, the present invention exhibits an advantageous effect in which power can be transmitted from a reader and/or writer to a proximity radio card (IC card) such as a CPU or the like having a large power consumption of typically about 5 mW and communications can be established by radio between the reader and/or writer and the proximity radio card, while a power transmitting wave is capable of satisfying the radio protection standard with sufficient allowance.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A reader and/or writer for generating an electromagnetic wave between an IC card and said reader and/or writer to thereby perform both supply of operating power to the IC card and transmission or transmission and reception of a communication signal by the generated electromagnetic wave, comprising:

means for detecting a human body or the IC card; and means for controlling the intensity of a magnetic field induced by the electromagnetic wave, based on a signal detected by said detecting means.

2. A reader and/or writer for generating an electromagnetic wave between an IC card and said reader and/or writer to thereby perform both supply of operating power to the IC card and transmission or transmission and reception of a communication signal by the generated electromagnetic wave, comprising:

means for detecting a human body or the IC card;

a communication control circuit for judging termination of communication between the IC card and said reader and/or writer; and means for controlling a starting time of power transmission based on a signal detected by said detecting means, and controlling an ending time of power transmission when said communication control circuit judges termination of communication between the IC card and said reader and/or writer.

3. A reader and/or writer for generating an electromagnetic wave between an IC card and said reader and/or writer to thereby perform both supply of operating power to the IC card and transmission or transmission and reception of a communication signal by the generated electromagnetic wave, comprising:

means for detecting a human body or the IC card;

a communication control circuit for judging termination of communication between the IC card and said reader and/or writer, and receiving from the IC card a response whether or not the IC card is a different kind card; and means for controlling a starting time of power transmission based on a signal detected by said detecting means, controlling an ending time of power transmission when said communication control circuit receives a response indicating that the card is a different kind card, and controlling the ending time of power transmission when the communication control circuit judges termination of communication with the IC card.

4. A reader and/or writer according to any one of claims 2 and 3, further comprising means for controlling the intensity of a magnetic field induced by the electromagnetic wave, based on a signal detected by said detecting means.

5. A reader and/or writer for generating an electromagnetic wave between an IC card and said reader and/or writer to thereby perform both supply of operating power to the IC card and transmission or transmission and reception of a communication signal by the generated electromagnetic wave, comprising:

means for controlling the intensity of a magnetic field induced by the electromagnetic wave, based on information of a power receiving level given to the IC card which is received from the IC card through the electromagnetic wave.

6. A reader and/or writer for generating an electromagnetic wave between an IC card and said reader and/or writer to thereby perform both supply of operating power to the IC card and transmission or transmission and reception of a communication signal by the generated electromagnetic wave, comprising:

means for controlling turn ON and/or OFF of the intensity of a magnetic field induced by the electromagnetic wave, based on information of a power receiving level given to the IC card which is received from the IC card through the electromagnetic wave.

7. A reader and/or writer for generating an electromagnetic wave between an IC card and said reader and/or writer to thereby perform both supply of operating power to the IC card and transmission or transmission and reception of a communication signal by the generated electromagnetic wave, comprising:

means for controlling the magnitude of power induced by the electromagnetic wave and a time required to transmit the power, based on information of a power receiving level given to the IC card which is received from the IC card through the electromagnetic wave.

8. A reader and/or writer for generating an electromagnetic wave between an IC card and said reader and/or writer to thereby perform both supply of operating power to the IC card and transmission or transmission and reception of a communication signal by the generated electromagnetic wave, comprising:

means for controlling the amplitude of a current or a voltage induced by the electromagnetic wave, based on information of a power receiving level given to the IC card which is received from the IC card through the electromagnetic wave.

9. A reader and/or writer according to any one of claims 5, 6, 7 and 8, further comprising means for detecting a human body or the IC card and means for controlling the intensity of a magnetic field induced by the electromagnetic wave, based on a signal detected by said detecting means.

10. A reader and/or writer for generating an electromagnetic wave between an IC card and said reader and/or writer to thereby perform both supply of operating power to the IC card and transmission or transmission and reception of a communication signal by the generated electromagnetic wave, comprising:

means for detecting a human body or the IC card;

a communication control circuit for judging termination of communication between the IC card and said reader and/or writer, and receiving from the IC card information of a power receiving level given to the IC card; and means for controlling a starting time of power transmission based on a signal detected by said detecting means, controlling the intensity of power transmission based on the information of the power receiving level received by said communication control circuit, and controlling an ending time of power transmission when said communication control circuit judges termination of communication with the IC card.

11. A reader and/or writer according to any one of claims 1–10, wherein said means for controlling includes an amplifier having a controllable gain.

12. A reader and/or writer according to any one of claims 1, 2, 3, 5, 6, 7, 8 and 10, further comprising:

a power supply portion for generating a power transmitting signal;

a modulator for modulating a signal obtained from said power supply portion;

a power feeding circuit for feeding power, based on a signal obtained from said modulator; and a coil or a spiral antenna for generating the electromagnetic wave corresponding to the current fed by said power feeding circuit.

13. A reader and/or writer according to any one of claims 1, 2, 3, 5, 6, 7, 8 and 10, further comprising:

a power supply portion for generating a power transmitting signal;

an encoder circuit for encoding transmission data inputted therein;

a modulator for amplitude-modulating the signal obtained from said power supply portion and superimposing the amplitude-modulated signal on the signal outputted from said encoder circuit;

a power feeding circuit for feeding power, based on a signal obtained from said modulator; and a coil or a spiral antenna for generating the electromagnetic wave corresponding to the current fed by said power feeding circuit.

14. A reader and/or writer according to any one of claims 5, 6, 7, and 8, wherein said IC card comprises:

a receiving portion for receiving power by an electromagnetic wave;

a rectifying power supply circuit for rectifying the power received by said receiving portion, converting the rectified power into a DC voltage and supplying the DC voltage;

a power receiving level detector circuit for detecting a power receiving level obtained from said rectifying power supply circuit;

a microcomputer for generating information corresponding to the power receiving level detected by said power receiving level detector circuit;

a decoder circuit for decoding information corresponding to a power receiving level outputted from said microcomputer; and a transmitter portion for modulating a signal based on a decoded signal corresponding to a power receiving level obtained from said decoder circuit and transmitting the modulated signal therefrom by an electromagnetic wave, wherein the information corresponding to the power receiving level is provided by the electromagnetic wave.

15. A reader and/or writer according to any one of claims 1, 2, 3, 5, 6, 7, 8, and 10, further comprising:

a power supply portion for generating a power transmitting signal;

a modulator for modulating a signal obtained from said power supply portion;

an amplifier for amplifying a signal obtained from said modulator, said amplifier comprising said control means;

a power feeding circuit for feeding power, based on a signal obtained from said amplifier; and a coil or a spiral antenna for generating the electromagnetic wave corresponding to the current fed by said power feeding circuit.

* * * * *